United States Patent

[11] 3,626,192

| [72] | Inventor | Daniel N. Held<br>New York, N.Y. |
|---|---|---|
| [21] | Appl. No. | 850,552 |
| [22] | Filed | Aug. 15, 1969 |
| [45] | Patented | Dec. 7, 1971 |
| [73] | Assignee | The Bendix Corporation |

[54] INTERFEROMETRIC DAYLIGHT STAR TRACKER
13 Claims, 4 Drawing Figs.

[52] U.S. Cl. ..................................... 250/203,
250/209, 250/217, 356/152
[51] Int. Cl. ..................................... G01c 3/08,
H01j 39/12, G01b 11/26
[50] Field of Search .......................... 250/203,
83.3, 217, 237, 209, 220; 356/4, 152

[56] References Cited
UNITED STATES PATENTS
3,046,404  7/1962  Biermann et al. ............. 250/203

3,199,400  8/1965  Zabinski ....................... 250/203 X
3,398,285  8/1968  Sachs ........................... 250/203 X

*Primary Examiner*—James W. Lawrence
*Assistant Examiner*—T. N. Grigsby
*Attorneys*—Peter C. Van Der Sluys and Plante, Arens, Hartz, Hix and Smith

ABSTRACT: A star tracker having an aperture for receiving and diffracting starlight and daylight. Interference fringes are formed form the starlight because of its coherent nature. A phase shifter is positioned to intercept a portion of the diffracted light and phase shift the intercepted light in response to a signal causing the interference fringes to be modulated in accordance with the signal. Photodetectors sense the fringe modulation and provide modulated outputs which are demodulated to provide DC voltages corresponding to the intensity of the detected interference fringes. The DC voltages are subtracted and the remainder used to energize a servo to aim the star tracker at a star.

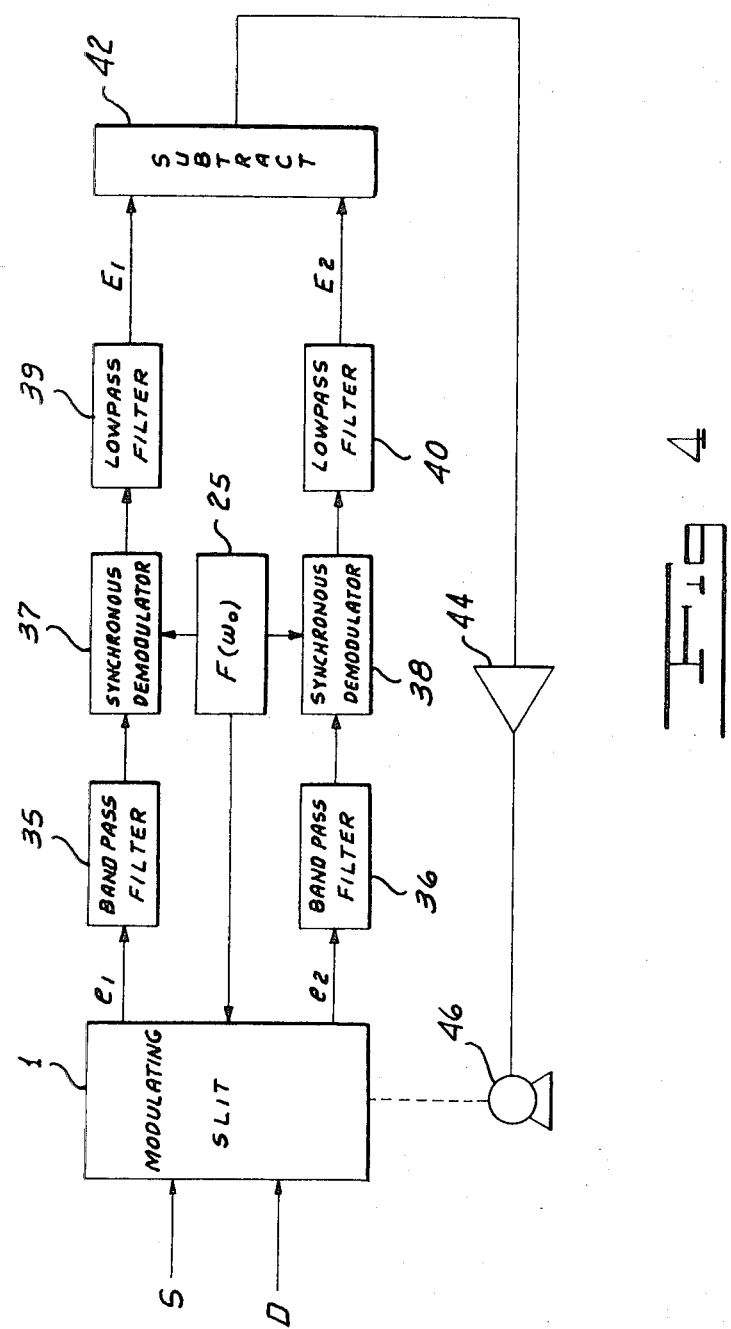

INTERFEROMETRIC DAYLIGHT STAR TRACKER

BACKGROUND OF THE INVENTION

1. Field of the Invention

This invention relates to star trackers and more particularly to daylight star trackers.

2. Description of the Prior Art

Heretofore daylight star detection and tracking was accomplished by limiting the instantaneous field of view of the detecting device so that background daylight was reduced to a level below that of the starlight. The received light was focused on a focal plane forming a star image which was sensed by a moving detector which scanned the focal plane. The requirement for a moving detector severely limited to the reliability and accuracy of the device and also necessitated excessive size, weight and power consumption.

SUMMARY OF THE INVENTION

The present invention contemplates a star tracker having an interferometric starlight detector for discriminating starlight from daylight. An aperture receives and diffracts both the daylight and starlight causing interference fringes to be formed from the coherent starlight while the incoherent daylight does not form a fringe pattern. A Pokells Effect Crystal, responsive to an alternating voltage, phase shifts a portion of the light causing the interference fringes to be modulated in accordance therewith. Two photodetectors are positioned at points on the focal plane for detecting the modulated fringes and providing modulated signals. The modulated signals are demodulated to provide DC voltages corresponding to the intensity of detected fringes. The DC voltages are subtracted and the remaining signal is used to position the star tracker until the fringe pattern remaining signal is centered between the photodetectors and the DC voltages are equal.

Thus the present invention provides an accurate and reliable device for detecting starlight which is obscured by daylight. Modulation of the interference fringes eliminates the requirement for a moving detector and the resulting inaccuracies and reduced reliability of mechanical devices.

One object of the invention is to detect starlight obscured by daylight.

Another object is to provide a starlight detector having no moving parts.

Another object is to provide a starlight detector having greater sensitivity and accuracy than was heretofore available.

Another object is to provide a starlight detector of reduced size and weight.

Another object is to provide a daylight star tracker.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however that the drawings are for illustration purposes only and are not to be construed as defining the limits of the invention.

DESCRIPTION OF THE DRAWINGS

FIG. 4 is a block diagram of a star tracker constructed in accordance with the present invention.

DESCRIPTION OF THE INVENTION

In daylight a star appears as a faint point source of light obscured by a bright daylight background. The star emits white light comprising many colors. However, the star can be considered a coherent light source providing coherent light of each color while the daylight background is incoherent white light. When both coherent and incoherent light is diffracted coherent light forms interference fringes and an interference pattern when focused on a focal plane, whereas incoherent light does not form an interference pattern but an even overlay of illumination of the focal plane.

The foregoing observed phenomena may be attributed to the fact that a star, having a small angular diameter, produces light which is coherent at the viewing point, over relatively large distances in the order of several yards. The sun on the other hand, which is an extended source, is coherent at the viewing point over relatively short distances measured in the order of microns, and the sky background which is a very large extended source can be considered incoherent. This presupposes that the light we are dealing with is essentially monochromatic. See Chapter X of the textbook "Principles Of Optics" by Max Born and Emil Wolf, Pergamon Press, 1959 particularly the conclusions at pages 508 and 509 thereof.

Figure 1:
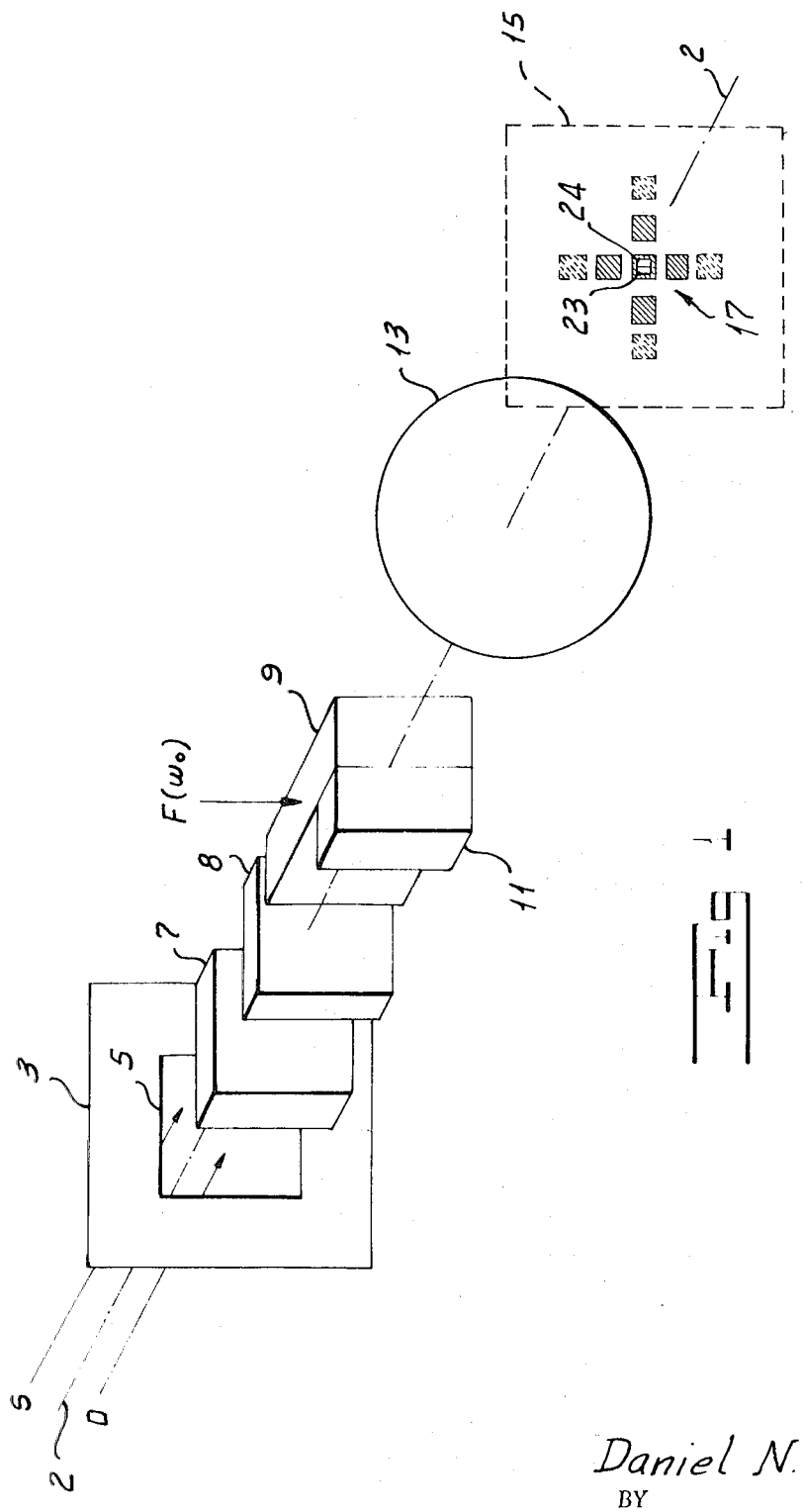
FIG. 1 is a block diagram of a modulating slit constructed in accordance with the present invention.

Referring to FIG. 1, there is shown a modulating slit 1 having an optic axis 2. A screen 3 has a slit 5 the center of which is on axis 2 for receiving and diffracting the starlight and daylight. A polarizing prism 7 is positioned in line with slit 5 so as to intercept and polarize the received light. A light filter 8 having a bandwidth of approximately 100 angstroms is positioned to intercept the polarized light and only pass light of one color. A Pockells Effect Crystal 9 is energized by an alternating voltage F at a Frequency $W_o$ and is positioned to intercept the light passing through one-half of slit 5. The crystal has a refractive index which varies in accordance with voltage F. Thus the light passing through crystal 9 is delayed or phase shifted in accordance with voltage F. A crystal 11 is positioned to intercept the light passing through the other half of slit 5 and delays the light passing therethrough by an amount equivalent to a delay caused by crystal 9 when voltage F is zero. A lens 13 having its center on axis 2 images the diffracted light onto a focal plane 15 to form an interference fringe pattern 17 from the coherent starlight as previously discussed.

The bandwidth of filter 8 may be varied to achieve any desired intensity and definition of the fringe pattern.

Figure 2:
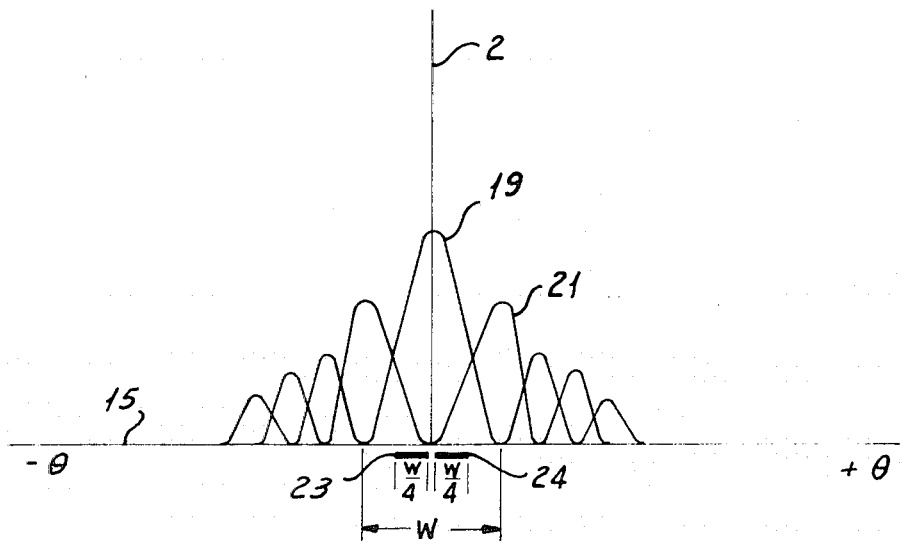
FIG. 2 is a graph showing the relative intensity of two fringe patterns.

Referring to FIG. 2, curve 19 shows the relative intensity of the interference fringes in the interference fringe pattern when voltage F is at a zero level and the optic axis 2 is aimed directly at the star. Curve 21 shows the intensity of the interference fringes when voltage F causes the light passing through crystal 9 to be phase shifted by 180°. The fringes in the fringe pattern are modulated in corresponding relation to voltage F.

Figure 3:
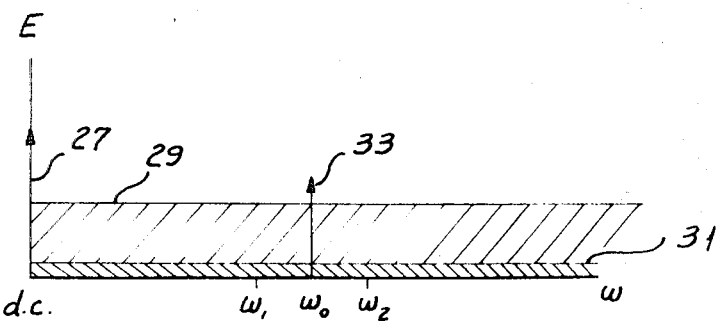
FIG. 3 is a graph showing the components of a signal provided by the photodetector shown in FIG. 1.

A pair of photodetectors 23 and 24 are fixed on focal plane 15 and positioned at each side of optic axis 2. For the most efficient operation the effective aperture of detectors 23 and 24 should equal one-fourth the width W of the first interference fringe as shown in FIG. 2. Photodetectors 23 and 24 are responsive to the detected light for providing signals $e_1$ and $e_2$ having components corresponding to daylight and starlight as shown in FIG. 3. The daylight background causes a large DC component 27 and a shot noise level 29 which appear over the entire frequency spectrum. The starlight causes a shot noise level 31 also appearing over the entire frequency spectrum and a signal 33 having a frequency $w_0$.

Referring to FIG. 4, a pair of band pass filters 35 and 36 are connected to modulating slit 1 for receiving signals $e_1$ and $e_2$ therefrom and for passing only frequencies between $w_1$ and $w_2$ shown in FIG. 3. A reference voltage source 25 provides a reference voltage F at a frequency $w_0$ to modulating slit 1. A pair of synchronous demodulators 37 and 38 are connected to band pass filters 35 and 36 respectively and to voltage source 25 and are responsive to the signals therefrom for providing output signals having DC components corresponding to the differences between the fringe intensities of curves 19 and 21 shown in FIG. 2. A pair of low pass filters 39 and 40 are connected to demodulators 37 and 38 respectively therefrom and for filtering out substantially all AC components corresponding to shot noise. Filters 39 and 40 provide DC output signals $E_1$ and $E_2$ corresponding to difference between curves 19 and 21 at the location of detectors 23 and 24 as shown in FIG. 2. When the optic axis is not aimed directly at the star fringe pattern is formed off center and signals $E_1$ and $E_2$ are unequal. Signals $E_1$ and $E_2$ are equal when the optic axis is aimed directly at the star.

A subtraction circuit 42 is connected to low pass filters 39 and 40 for receiving signals $E_1$ and $E_2$ and providing a signal corresponding to the difference between signals $E_1$ and $E_2$. A servo amplifier 44 is connected to subtraction circuit 42 and is responsive to the difference signals therefrom for energizing a servo motor 46. Servo motor 46 is drivably connected to modulating slit 1 for positioning and modulating slit until the optic axis is aimed at a star and signals $E_1$ and $E_2$ are equal.

When operating the above described embodiment the optic axis must first be roughly aimed at the star before the servo system will lock onto the star. If the difference between the direction of the star and the direction in which the optic axis is aimed exceeds a specified angle the star tracker will drive away from the star and not lock onto the star.

It should be borne in mind that while atmospheric turbulence may cause an apparent position of the star to continuously shift around some central or average position, the tracker will track the centroid of the scintillating star image due to the action of the low pass filters 39 and 40 of FIG. 4 which effectively take a time average of the output signal in a conventional manner.

The dimension W is relatively large in comparison with the random variations in the apparent position of the star under normal tracking conditions. However it has been observed that atmospheric conditions at or near the horizon are not conductive to normal star tracking conditions when viewed at ground level. It will be seen then that under normal star tracking conditions any shift from side to side in the apparent position of the star would rarely be greater than the dimension W.

An alternate embodiment of the star tracker utilizes an array of photodetectors fixedly mounted on the focal plane. Each photodetector has a corresponding band pass filter, synchronous detector and low pass filter for providing a DC signal corresponding to the intensity of the detected interference fringe. The position of the photodetector receiving the maximum intensity corresponds to the position of the star relative to the direction in which the optic axis is aimed. In this embodiment a servo system is not required as in the first embodiment and the initial aiming need not be as accurate as required by the first embodiment.

A star tracker constructed in accordance with the present invention is capable of detecting and tracking stars that are obscured by daylight and has greater sensitivity and accuracy than was heretofore available. The device has no moving parts and therefore has increased reliability, lighter weight and smaller size than starlight detectors provided by the prior art.

What is claimed is:

1. A detector for detecting coherent starlight obscured by incoherent daylight, comprising:
   means for diffracting the light to form interference fringes from the coherent starlight and an overlay of illumination from the incoherent daylight;
   means to filter the light so as to provide a substantially monochromatic light output;
   means for modulating the interference fringes of the light output; and
   means for detecting fringe modulation and for providing a signal that is independent of the daylight and corresponds to the intensity of the detected fringe.

2. A detector as described in claim 1, in which the modulating means comprises means for varying the phase of a portion of the output light.

3. a detector as described in claim 1, in which the modulating means comprises means for varying the optical path length of a portion of the output light.

4. A detector as described in claim 1, in which the modulating means comprises a Pockells Effect Crystal.

5. A detector as described in claim 1, in which the last mentioned means comprises a photodetector for detecting approximately one-fourth the width of the first interference fringe.

6. A detector as described in claim 5, in which the photodetector is fixedly located and provides a signal modulated in accordance with the fringe modulation.

7. A detector as described in claim 6, including a lens for focusing the interference fringes on a focal plane the photodetector being positioned on the focal plane of the lens.

8. A detector as described in claim 1, in which the last mentioned means comprises:
   a photodetector fixedly located and providing a signal modulated in accordance with the fringe modulation; and
   a demodulator for demodulating the photodetector signal and providing a signal corresponding to the intensity of the detected fringe.

9. A detector as described in claim 1, in which the diffracting means comprises a screen having an aperture.

10. A detector as described in claim 1, additionally comprising a reference source providing an alternating signal and connected to the modulating means for modulating the interference fringes in accordance with the alternating signal.

11. A detector as described in claim 1, including:
    a reference source providing an alternating signal and connected to the modulating means for modulating the interference fringes in accordance with the alternating signal, the detecting means comprises;
    a photodetector located at a fixed position for providing an output signal modulated in accordance with the fringe modulation; and
    a synchronous demodulator responsive to the photodetector output and the alternating signal for providing a DC signal that is independent of the daylight and corresponds to the intensity of the detected fringe.

12. A detector for detecting coherent starlight obscured by incoherent daylight, comprising;
    a screen having a slit for diffracting the light;
    a lens for focusing the diffracted light on a focal plane, whereby the starlight forms interference fringes because of its coherent nature and the daylight forms an overlay of illumination on the interference fringes;
    means to filter the light so as to provide a substantially monochromatic light output;
    a signal source for providing an alternating signal of predetermined frequency;
    means for intercepting a portion of the output light and for varying the optical path length of the intercepted light in accordance with the alternating signal to modulate the interference fringes of the light output;
    a photodetector fixedly positioned on the focal plane for sensing the fringe modulation of the output light and providing a signal modulated in accordance with the fringe modulation; and
    a synchronous demodulator connected to the photodetector and the signal source and responsive to the signals therefrom for providing a DC signal independent of the daylight and corresponding to the intensity of the detected fringe.

13. A daylight star tracker, comprising:
    means for receiving and diffracting coherent starlight and incoherent daylight to form an interference fringe pattern from the starlight and an overlay of illumination from the incoherent daylight, said means having an optic axis to be aimed at a star;
    means to filter the light so as to provide a substantially monochromatic light output;
    means for modulating the interference fringes of the light output;
    a pair of photodetectors fixedly positioned on each side of the optic axis for sensing the fringe modulation of the output light and providing signals modulated in accordance with the fringe modulation;

a pair of demodulators connected to the photodetectors for demodulating the signals therefrom and providing output signals corresponding to the intensity of the detected fringes; and means responsive to the last two mentioned signals for positioning the receiving means so that its optic axis is aimed at the star and the output signals are of equal amplitude.

* * * * *